United States Patent
Kraning

(10) Patent No.: US 11,684,192 B2
(45) Date of Patent: Jun. 27, 2023

(54) PRESENTATION SYSTEM HAVING STATIC AND DYNAMIC COMPONENTS

(71) Applicant: Jason Kraning, Greenville, SC (US)

(72) Inventor: Jason Kraning, Greenville, SC (US)

(*) Notice: Subject to any disclaimer, the term of this patent is extended or adjusted under 35 U.S.C. 154(b) by 527 days.

(21) Appl. No.: 16/830,149

(22) Filed: Mar. 25, 2020

(65) Prior Publication Data

US 2020/0305627 A1 Oct. 1, 2020

Related U.S. Application Data

(60) Provisional application No. 62/823,603, filed on Mar. 25, 2019.

(51) Int. Cl.
| | | |
|---|---|---|
| A47G 33/00 | (2006.01) | |
| G03B 21/14 | (2006.01) | |
| G09F 19/18 | (2006.01) | |
| H05B 47/11 | (2020.01) | |
| H04N 21/40 | (2011.01) | |
| B44F 1/06 | (2006.01) | |
| B44F 1/08 | (2006.01) | |
| B44F 1/00 | (2006.01) | |
| H05B 47/10 | (2020.01) | |
| H04N 21/41 | (2011.01) | |
| H05B 47/115 | (2020.01) | |
| F21W 131/304 | (2006.01) | |

(52) U.S. Cl.
CPC ............ *A47G 33/00* (2013.01); *G03B 21/14* (2013.01); *G09F 19/18* (2013.01); *H05B 47/115* (2020.01); *B44F 1/00* (2013.01); *B44F 1/06* (2013.01); *B44F 1/08* (2013.01); *F21W 2131/304* (2013.01); *H04N 21/40* (2013.01); *H04N 21/4122* (2013.01); *H05B 47/10* (2020.01)

(58) Field of Classification Search
None
See application file for complete search history.

(56) References Cited

U.S. PATENT DOCUMENTS

2012/0249980 A1* 10/2012 Kepley, Jr. ............ G03B 21/58
  353/79
2018/0129764 A1  5/2018 Hartmann

FOREIGN PATENT DOCUMENTS

CN 110392251 A * 10/2019 ........... G06T 19/006
JP H01146505 A   6/1989
(Continued)

OTHER PUBLICATIONS

Bannerstandpros, Illuminated Great Wall 8×8, website, Mar. 4, 2019, URL: https://www.bannerstandpros.com/banner-stands/tension-fabric-banner-stands/illuminated-greatwall-8x8.html.

*Primary Examiner* — Sultan Chowdhury
*Assistant Examiner* — Danell L Owens
(74) *Attorney, Agent, or Firm* — Kim and Lahey Law Firm, LLC; Douglas W. Kim

(57) ABSTRACT

A presentation system for a celebration of an individual comprising: a frame; a lighting system disposed along an inner edge of a perimeter of the frame; a fabric removably attached to the frame disposed outwardly from the lighting system adapted to be illuminated by the lighting system; an image included on the fabric associated with aspects of a subject of the celebration of the individual; and, a memorial container disposed in front of the fabric wherein the image and the memorial container cooperate to form a composite image when viewed by an audience.

14 Claims, 6 Drawing Sheets

(56) References Cited

FOREIGN PATENT DOCUMENTS

| | | | |
|---|---|---|---|
| JP | H10243871 A | 9/1998 | |
| JP | 2000139678 A | 5/2000 | |
| JP | 2002203253 A | 7/2002 | |
| JP | 2007299434 A | 11/2007 | |
| JP | 3141923 U | 5/2008 | |
| JP | 2011013302 A | 1/2011 | |
| JP | 2018129764 A | 8/2018 | |
| JP | 6411052 B2 | 10/2018 | |
| KR | 101539349 B1 * | 7/2015 | ............. G03B 21/00 |

\* cited by examiner

PRESENTATION SYSTEM HAVING STATIC AND DYNAMIC COMPONENTS

BACKGROUND OF THE INVENTION

1) Field of the Apparatus

This system is directed to a customizable display for events, to associate the displayed images environment with the subject matter or purpose of the event.

2) Description of the Related Art

At the end of life, it is common for the recently passed individual to be viewed for a final time by family, friends and other mourners. Traditionally, this event occurs at a funeral home with the recently deceased lying in a casket placed in a room allowing mourners to walk up to the casket, view the deceased, and pay their last respects.

In modern times, the funeral event is held soon after death. In North America, this means no longer than one or two weeks from death. One reason for the short period of time is that the body begins to decompose which causes the funeral to become time sensitive for several reasons. The specific time between death and the mourning is a balance of competing interests including organizing the mourners, having a suitable and respectful period of grieving, and allowing the close mourners time to find closure.

In practice, the time between the death and the funeral is around two to three days because the body will decompose and cease to be presentable for an open casket service. Some families choose to have the body embalmed in order to preserve it longer, to expand the time between the death and the funeral. But this is a costly option, and due to the chemicals used in the embalming process, it may be detrimental to the environment if the body is buried.

Traditionally, funerals are somber events in the presentation, decorations and mood of the event, for obvious reasons. Increasingly, the funeral ceremony pays tribute to the deceased person's life instead of mourning their death. Instead of looking ahead to the afterlife, funerals are increasingly rejoicing memories of the deceased person's triumphs, relationships, activities, and other aspects of life. Unfortunately, the drab decor common to many funeral homes is contrary to this trend.

In recent time, there is also a movement to a closed-casket ceremony. This option is popular when the time between the death and the funeral needs to be expanded or for certain non-traditional funeral arrangements, such as a "celebration of life" ceremony. A celebration of life ceremony has been described as an orderly and potentially spiritual transition of the deceased from one social status to another. It can be directed to telling the story of the deceased person rather than mourning the death. Celebrations of life can be where "mourners" gather to celebrate the unique personality and achievements of the deceased, rather than to merely witness or mark the death and mourning with the survivors. Celebrations of life are more flexible and creative in their organization as they are dependent upon the deceased, rather than a traditional funeral service dictated by tradition or religion. Celebrations of life are commonly held after the physical remains have been cared for through burial or cremation because they require more time to plan the event. This time is needed to allow the presentation of the deceased person's life and event planning to properly celebrate the life of the individual based upon that specific individual's life.

The challenge is that with the growing popularity of the celebration of life, the traditional visitation, funeral services and committal services are not well suited to accomplish the goals, mood or presentation of the celebration of life. Further, the customization of the event or presentation is challenging at the traditional funeral services. In Japan, there have been several attempts to customize the funeral service to the deceased such as with Japanese Patent Publication 2018/129764 which is directed to a funeral content image projection system which allows for projecting an image, including a content for use in the funeral, during the funeral services. Japanese Patent JPH10243871 is directed to a system designed to introduce the attendees with the specifics of the deceased life even when those attendees were not that well acquainted with the deceased. Disadvantages with these systems include the need for a projector, the inability to have memorial articles from the celebration of life, requirement of the grieving survivors to provide images and other material about the deceased and that the presentation requires electrical power.

It would be advantageous to have an event presentation that can be tailored to the deceased person's life without the time lag normally associated with creating customized displays.

It would be advantageous to have an event presentation that included memorial articles for attendees associated with the deceased and the celebration of life.

It would be advantageous to have an event presentation system that can use easily replaceable images.

BRIEF SUMMARY OF THE INVENTION

The above objectives are accomplished by providing a presentation system comprising: a frame having a lighting system disposed along the inner wall of a perimeter of the frame; a flexible fabric removably attached to the frame; an image disposed on the frame associated with aspects of the subject of the event; a casket disposed in front of the fabric wherein the image and the fabric cooperate to form a composite image when viewed; and, a projector displaying static and dynamic images on one or more of the frame, fabric and casket.

The system can include a frame that can be assembled from several frame elements allowing the frame to be disabled, transported or stored and then assembled for use. A lighting system can be disposed along an inner edge of a perimeter of the frame to provide for lighting of a screen or fabric carried by the frame. The fabric can be removably attached to the frame so that the fabric can be rolled for transportation and deliver and unrolled and attached to the frame in operation. The fabric can be disposed outwardly from the lighting system so that the fabric can be illuminated by the lighting system from behind the fabric. An image can be included on the fabric associated with aspects of a subject of the celebration of the individual. A memorial container can be disposed in front of the fabric wherein the image and the memorial container cooperate to form a composite image when viewed by an audience. The image on the fabric can be designed and arranged on consideration of the memorial container so that the overage image is presented to the audience without the memorial container simply obscuring the image, but complementing the image and can provide a composite viewing experience.

The lighting system can include a lighting controller adapted to vary a brightness and a color of the lighting system. The lighting controller can be actuated by a motion sensor. the memorial container can be a casket or urn and stand. A projector can be included that can display dynamic images on one or more of the fabric, the memorial container, or a combination thereof.

A second frame can be included with a second fabric and a second image wherein the second image can be associated with the first image so that the first and second image display a customizing composite image according to the celebration of the individual. The second image can be provided by a second projector cooperatively associated with the second fabric. A display can be included and adapted to display a second image associated with the first image so that the first image and the second image provide a customizing composite image according to the celebration of the individual. The first image can be provided in a first location and a second image provided in a second locations. An audio system can be included to provide audio associated with the celebration of the individual. The fabric can be adapted to be converted into a memorial article according to the celebration of the individual. The fabric can be custom printed for memorializing the celebration of the individual. The fabric is adapted to be segmented into segments that can be converted into a memorial article.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

Figure 1:
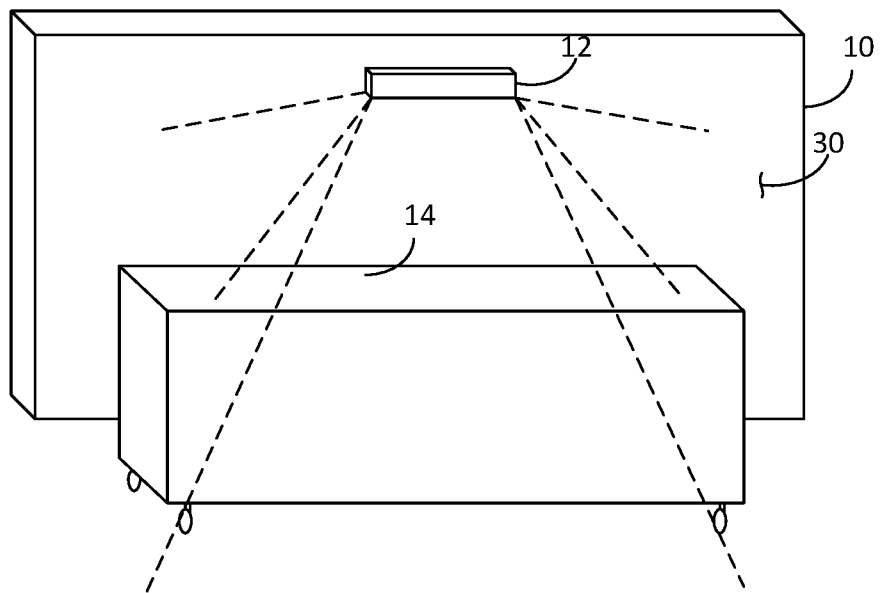
FIG. 1 is a perspective of aspects of the system.
Figure 2:
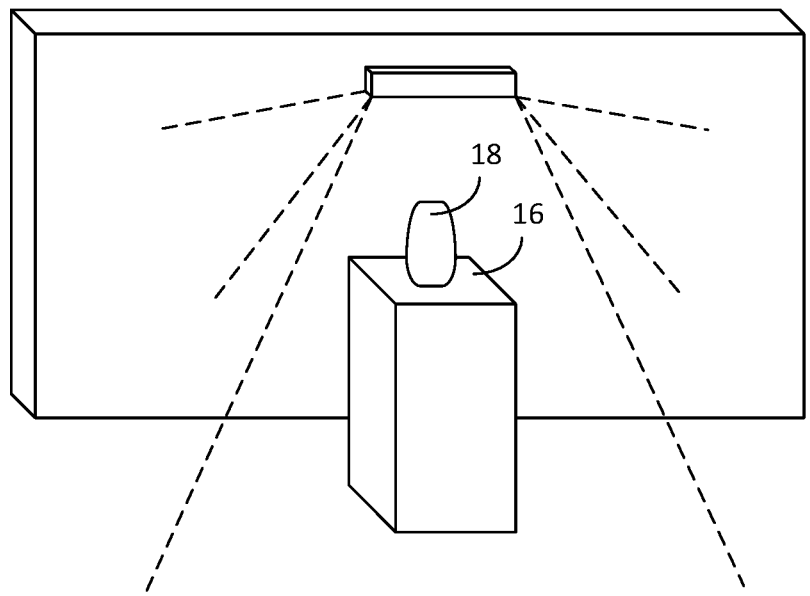
FIG. 2 is a perspective of aspects of the system.

With reference to the drawings, the invention will now be described in more detail. Referring to FIGS. 1 and 2, a frame 10 having internal lighting can be positioned behind a casket 14 or urn 18 and stand 16. The internal lighting can be positioned on an opposite side from the casket or urn so that the image on a fabric or screen is illuminated with rear lighting. The frame can be square, rectangular or other shape with lights, such a LED lights, around the inner walls of the perimeter to provide lighting within the frame to provide rear illuminations of the screen. The lighting can be modified as to color and brightness allowing for different lighting conditions within the frame and projected outward from the frame. A lighting controller can be used to actuate predetermined lighting conditions based upon the screen placed on the frame so that custom lighting setting need not be required for each screen placed on the frame. For example, a first screen can have an image of outdoor sports, such as fishing, tennis, golf and the like. A second screen can include indoor activities such as pool, bowling, cooking, and the like. The lighting controller can have a first setting associated with the first screen so that the first screen setting is brighter to correspond with the outdoor activity. The lighting controller can have a second setting associated with the second screen so that the second screen setting is dimmer to correspond with the indoor activity.

The frame can receive flexible and removable screen that can be made from fabric 30 having images printed on the fabric. The image, being rear lit or backlit, can have high resolution and vibrant colors to support the decor of a celebration of life. The image can be associated with the deceased and reflect some aspect specific to the deceased's life such as a hobby, interest, profession and the like. As the fabrics are removable, they can be easily replaced for each celebration allowing for customizing the image for each celebration. The casket 14, urn 18 and stand 16 can be positioned in front of the frame and the image designed to accent the casket or stand and urn, rather than be blocked by the casket, stand or urn. A projector 12 can be included in the assembly that can project a second image that can cooperate with the frame image, casket or urn, stand and floor. The projector can be activated by motion, proximity or other means and modify the projected image accordingly.

Figure 3A:
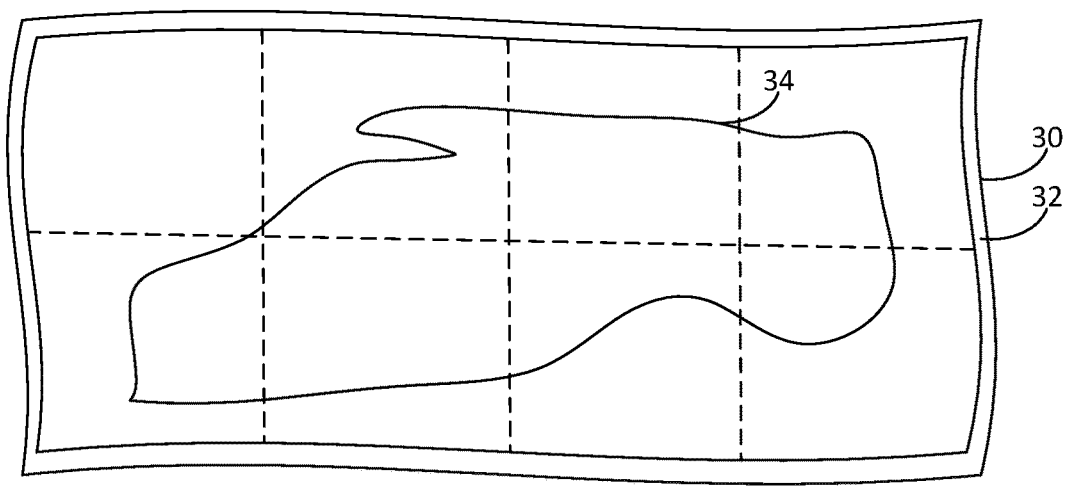
FIG. 3A is a front view of aspects of the system.

Referring to FIG. 3A, the fabric 30 includes a perimeter edge 32 which can be removably affixed to the frame using hook and loop fasteners, snaps, clips, adhesive, magnets, and the like. The image 34 is imprinted on the fabric, associated with or related to the deceased, and can be one or many in an existing inventory. When an event is planned, the organizer can provide a catalog or listing of the available images that can be selected as associated with the event. For example, sporting events, nature, outdoors, branches, scenes and the like. The frame can be installed at the event location and used for multiple events, funerals, celebrations of life or other events. The organizer rents the fabric, it is delivered to the location of the event, installed and viewed at the event. When the event is completed, the fabric can be returned into inventory for subsequent order, rent or use.

Figure 3B:
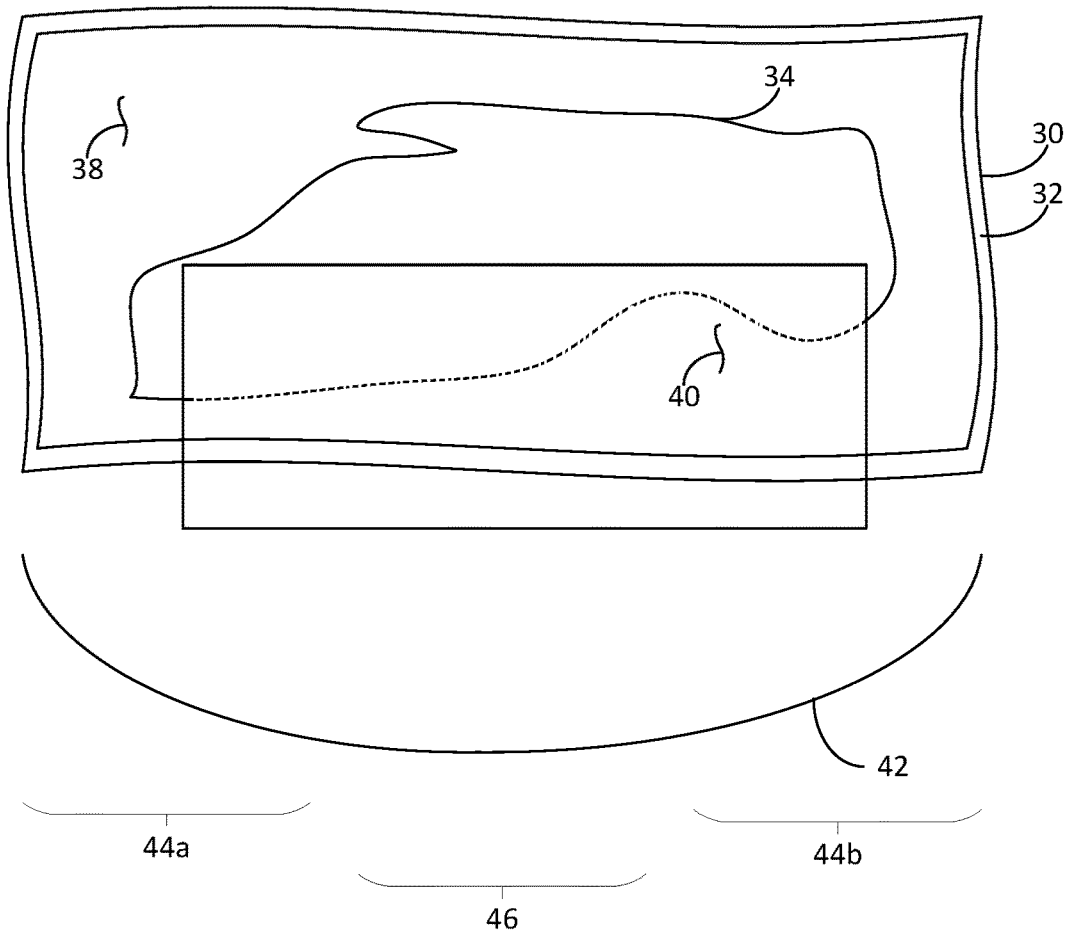
FIG. 3B is a front view of aspects of the system.
Figure 3C:
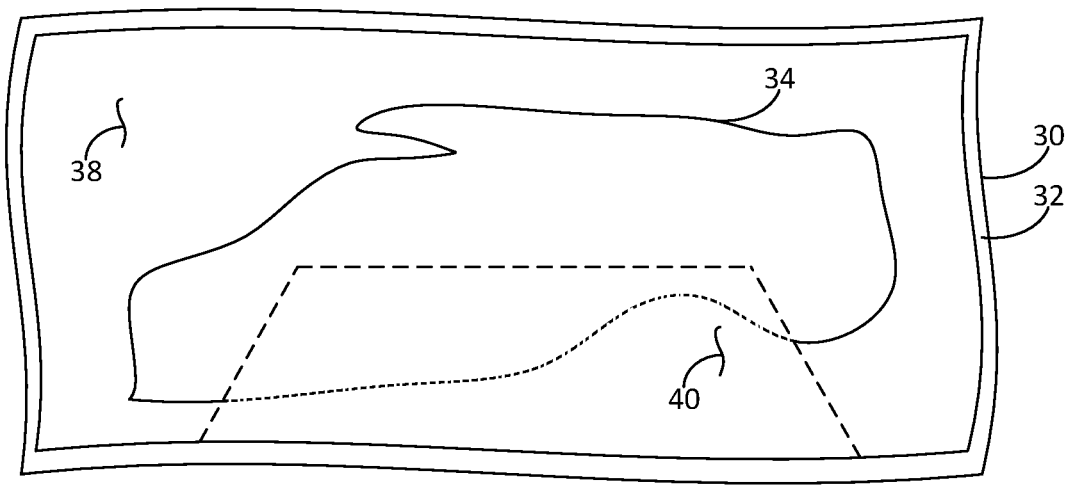
FIG. 3C is a front view of aspects of the system.

Referring to FIG. 3B, the fabric can include an image that cooperates with the footprint of the casket and urn and stand. The fabric 30 can include as image 34 that is designed to have a primary portion 38 and secondary portion 40. The primary portion is designed to be visible from various viewing angles in viewing arc 42 so that primary portion is not obscured by the casket or urn and stand. The primary viewing image can provide sufficient content so that the image is identifiable to the audience to identify the customizing image for the celebration. The secondary portion is also part of the customizing image for the celebration but is not necessary for the audience to identify the subject matter of the customizing image for the celebration. The secondary image can be visible at lateral ends 44a and 44b of the viewing arc but obscured from a center portion 46 of the viewing arc. Referring to FIGS. 3C and 3D, the primary portion can include lateral portions defined by sloping boundaries. These sloping boundaries allow the primary portion to be viewable when the audience is not horizontally even with the primary portion.

The fabric can also be converted into a memorial article. For example, the fabric can be cut into sections such as section 36. The section can be converted into a memorial article such as pillow, blanket of other article as a memorial of the deceased. In this example, the organizer could rent the fabric, then determine that the memorial is desired and purchase the fabric for subsequent conversion to a memorial article.

Figure 4A:
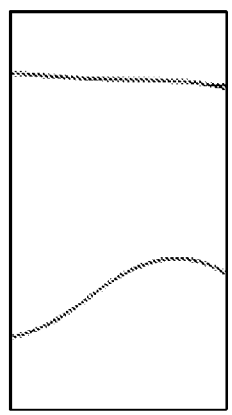
FIG. 4A is a front view of aspects of the system.
Figure 4B:
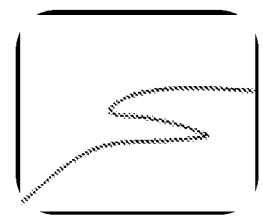
FIG. 4B is a front view of aspects of the system.

FIG. 4A shows a portion of the fabric converted into an article such as a blanket. FIG. 4B shows a portion of the fabric converted into an article such as a pillow.

Figure 5:
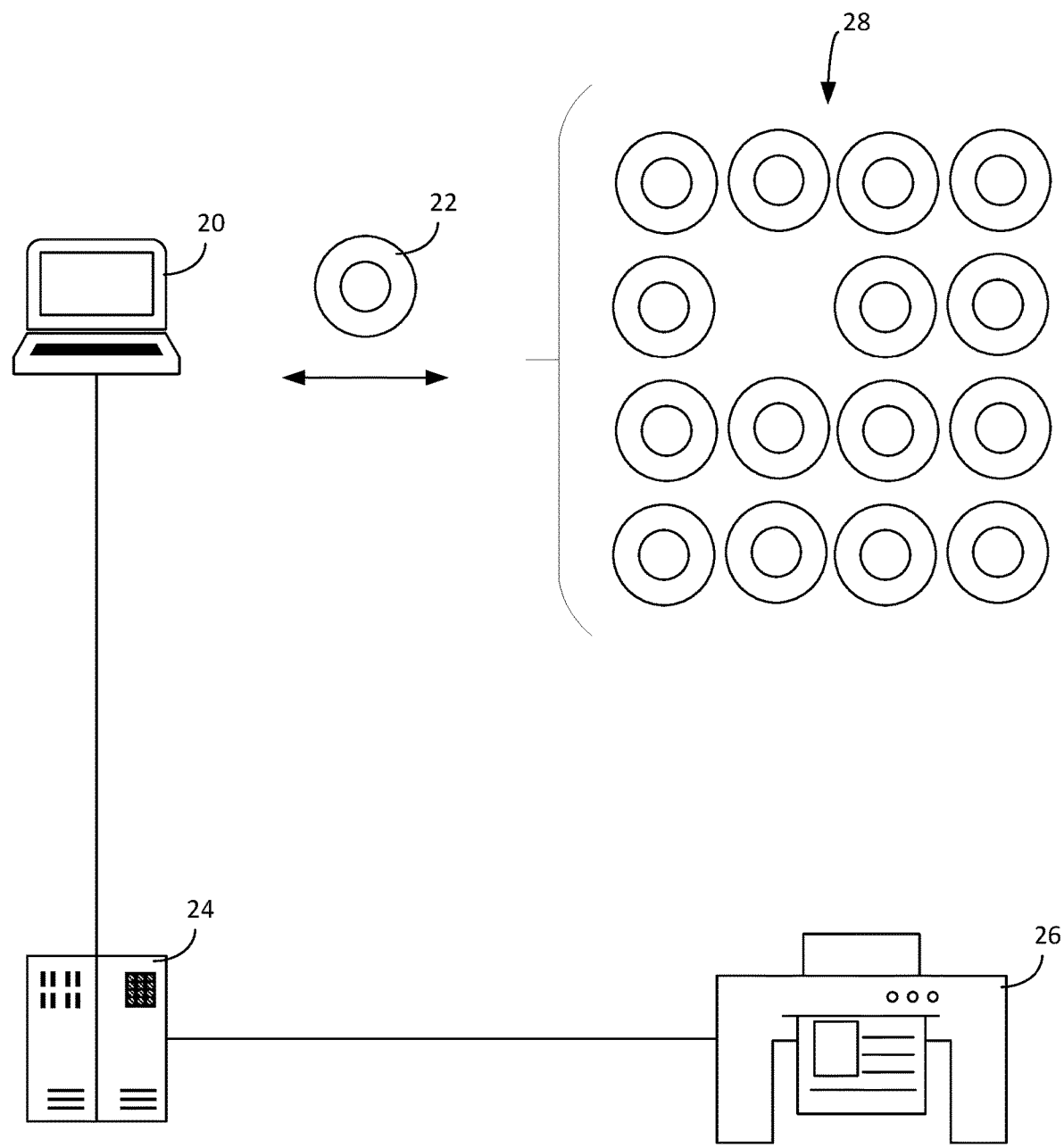
FIG. 5 is a schematic of aspects of the system.
Figure 6:
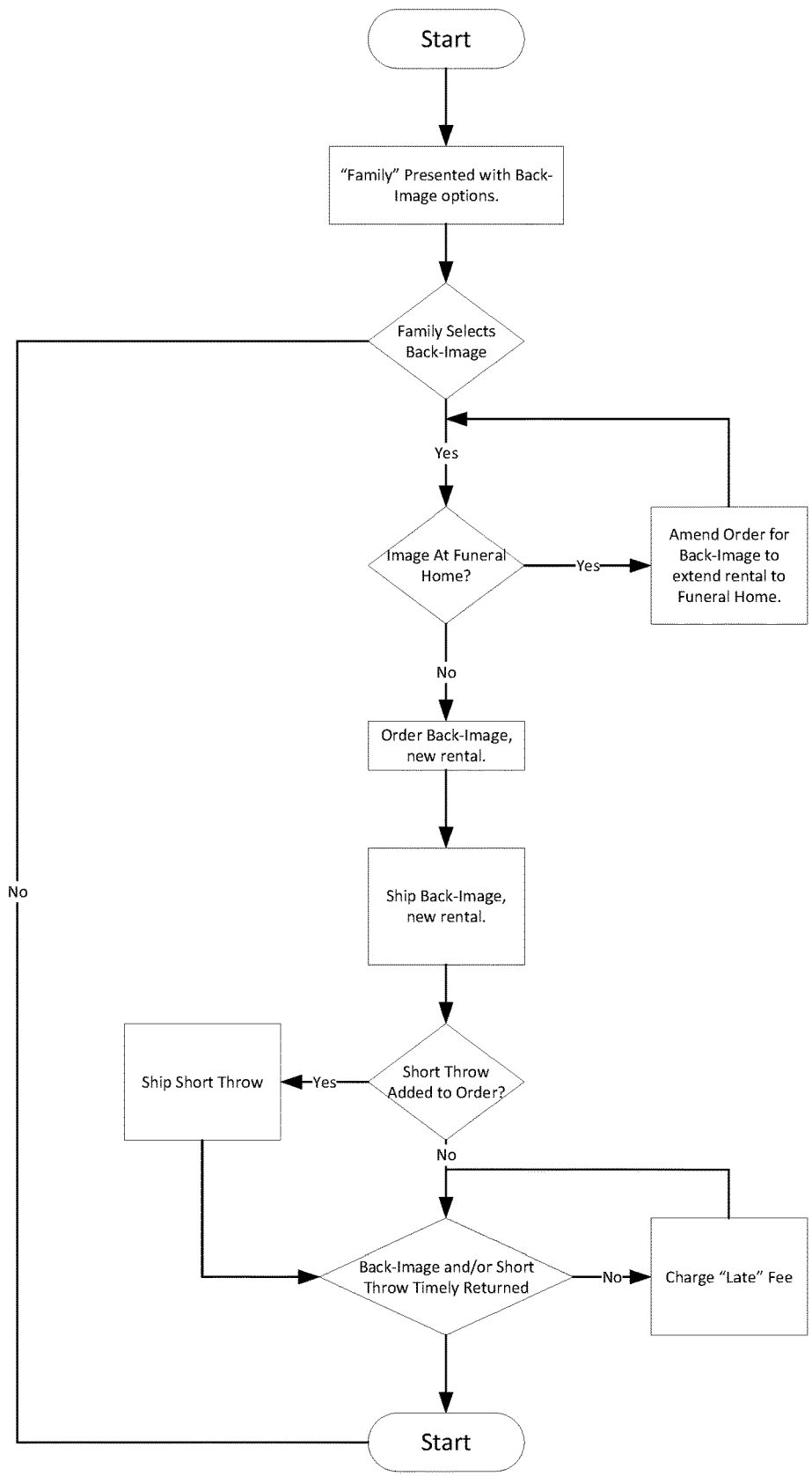
FIG. 6 is a flow chart of aspects of the system; and,
FIG. 7 is a schematic of aspects of the system.

Referring to FIG. 5, the physical location of the celebration of life (e.g. funeral home) or website can be used to allow the organizer or survivors to select a theme or background image from an inventory of images. The selected image 22 can then be removed from a remote inventory 28 and shipped to the appropriate location. Shipping can be accomplished in a few days since an inventory of images can be maintained. Billing system 24 can be used and associated with the image and can base fees on time of rental, events, and other factors. In some cases, time permitting, the image can be custom designed and imprinted on the fabric with printer or service 26. When the event is over, the fabric can be completed or even sold to the survivors for subsequent use (e.g. conversion into other products, segmented and framed, blankets, etc.).

Figure 7:
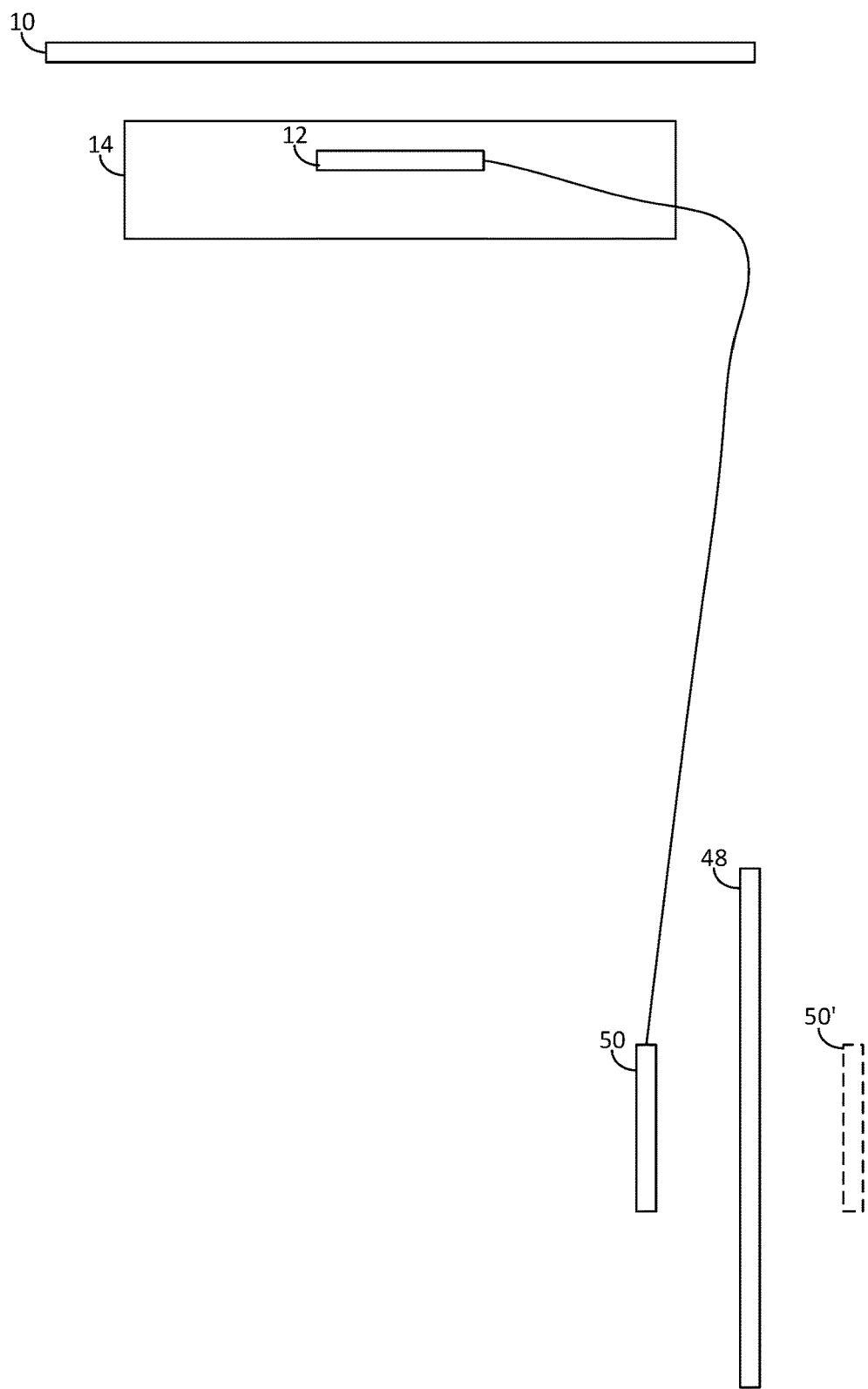

Referring to FIG. 7, the frame 10 adapted to receive the fabric is positioned to the rear of casket 14 or urn and stand with projector 12 disposed vertically over the casket or urn and stand, directly above or offset from casket or urn and stand. A second frame 48 that includes a second screen or fabric and a second image. The first fabric of the first frame 10 can be cooperatively designed with the second image so that the two images provide a customizing composite image for the celebration. For example, if an interest of the deceased were golf, the second image can be a fairway and the first image a green. The audience can be presented with images that can be temporarily, geography, categorically or otherwise associated.

The second image can be provided with a second projector 50 on the second screen where the second screen is blank. The second projector can be a forward projector or rearward projector 50'. The second projector 50 can be in electronic communications with a first projector 12 so that any images that are displayed are coordinated. The second image can be disposed in a separate room than the first image so that a coordinated viewing experience is provided as the viewer passes from the second image to the first image. The second projector can be coordinated with the first projector where the first projector supplements the image of the first fabric. As the first projector adds supplemental images to the first fabric an associated image can be displayed from the second projector on the second screen. For example, the first projector can provide a visual effect representing the wind blowing while the second projector image can also show the wind blowing consistent with the projection of the first projector. Audio can also be provided that emulates the sound of wind in consistent with the first and second projector.

The second projector can also include text and other content that is customized for the celebration. By combining at static customized image of the first screen with the dynamic flexibility of the second projector, the audience is provided with an experience that is customized and reflective of the deceased without risking the event resembling a video production. The first screen allows for a more dignified presentation for the celebration while the second screen, which can be disposed in a separate room, allows for text and other content that can change dynamically. Further, using a first fabric allows the viewing audience to focus on the ceremony and not be overly engaged with a digital presentation. Further, the fabric allows memorabilia to be created from the fabric as keepsakes, an option not readily available for digital video productions.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A presentation system for a celebration of an individual comprising:
   a first frame;
   a lighting system disposed along an inner edge of a perimeter of the first frame;
   a first fabric removably attached to the first frame disposed outwardly from the lighting system adapted to be illuminated by the lighting system;
   a first image included on the first fabric associated with aspects of a subject of the celebration of the individual;
   a memorial container disposed in front of the first fabric wherein the first image and the memorial container cooperate to form a composite image when viewed by an audience;
   a second frame; and,
   a second fabric with a second image wherein the second image is associated with the first image so that the first and second image display a customizing composite image according to the celebration of the individual.

2. The presentation system of claim 1 wherein the lighting system includes a lighting controller adapted to vary a brightness and a color of the lighting system.

3. The presentation system of claim 2 wherein the lighting controller is actuated by a motion sensor.

4. The presentation system of claim 1 wherein the memorial container is a casket or urn and stand.

5. The presentation system of claim 1 including a projector displaying dynamic images on one of the fabric, the memorial container, or combination.

6. The presentation system of claim 1 wherein the second image is provided by a second projector cooperatively associated with the second fabric.

7. The presentation system of claim 1 wherein:
   the image is a first image; and,
   a display adapted to display a second image is associated with the first image so that the first image and the second image provide a customizing composite image according to the celebration of the individual.

8. The presentation system of claim 1 including an audio system for providing audio associated with the celebration of the individual.

9. A presentation system for a celebration of an individual comprising:
   a frame;
   a lighting system disposed along an inner edge of a perimeter of the first frame;
   a fabric removably attached to the frame disposed outwardly from the lighting system adapted to be illuminated by the lighting system;
   an image included on the fabric associated with aspects of a subject of the celebration of the individual;

a memorial container disposed in front of the fabric wherein the image and the memorial container cooperate to form a composite image when viewed by an audience; and, wherein the fabric is adapted to be converted into a memorial article according to the celebration of the individual.

10. A presentation system for a celebration of an individual comprising:
a frame;
a lighting system disposed along an inner edge of a perimeter of the first frame;
a fabric removably attached to the frame disposed outwardly from the lighting system adapted to be illuminated by the lighting system;
an image included on the fabric associated with aspects of a subject of the celebration of the individual;
a memorial container disposed in front of the fabric wherein the image and the memorial container cooperate to form a composite image when viewed by an audience; and,
wherein the fabric is custom printed for memorializing the celebration of the individual.

11. A presentation system for a celebration of an individual comprising:
a frame;
a lighting system disposed along an inner edge of a perimeter of the first frame;
a fabric removably attached to the frame disposed outwardly from the lighting system adapted to be illuminated by the lighting system;
an image included on the fabric associated with aspects of a subject of the celebration of the individual;
a memorial container disposed in front of the fabric wherein the image and the memorial container cooperate to form a composite image when viewed by an audience; and,
wherein the fabric is adapted to be segmented into segments that can be converted into a memorial article.

12. A presentation system for a celebration of an individual comprising:
a first frame;
a lighting system disposed along an inner edge of a perimeter of the first frame
a lighting controller in electronic communications with the lighting system adapted to vary a brightness and a color of the lighting system;
a first fabric removably attached to the first frame disposed outwardly from the lighting system adapted to be illuminated by the lighting system;
a first image included on the first fabric associated with aspects of a subject of the celebration of the individual;
a memorial container disposed in front of the first fabric wherein the first image and the memorial container cooperate to form a composite image when viewed by an audience;
a projector displaying dynamic images on one of the first fabric and the memorial container;
a second frame;
a second fabric with a second image wherein the second image is associated with the first image so that the first image and the second image display a customizing composite image according to the celebration of the individual;
an audio system for projecting audio associated with the celebration of the individual; and,
wherein the first fabric is custom printed and adapted to be segmented into one or more segments that can be converted into one or more memorial articles.

13. The presentation system of claim 12 wherein the memorial container is a casket or urn and stand.

14. The presentation system of claim 12 wherein the second image is provided by a second projector cooperatively associated with the second fabric.

* * * * *